(12) United States Patent
Wang et al.

(10) Patent No.: US 9,830,454 B2
(45) Date of Patent: Nov. 28, 2017

(54) WEB APPLICATION SECURITY ACCESS METHOD, SERVER, AND CLIENT

(71) Applicant: Huawei Device Co., Ltd., Shenzhen (CN)

(72) Inventors: Yahui Wang, Beijing (CN); Wenmei Gao, Beijing (CN); Shunan Fan, Beijing (CN); Xiaoqiang Lv, Shenzhen (CN); Hao Jing, Shenzhen (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 34 days.

(21) Appl. No.: 14/898,995

(22) PCT Filed: Jun. 17, 2014

(86) PCT No.: PCT/CN2014/080094
§ 371 (c)(1),
(2) Date: Dec. 16, 2015

(87) PCT Pub. No.: WO2014/206223
PCT Pub. Date: Dec. 31, 2014

(65) Prior Publication Data
US 2016/0125185 A1 May 5, 2016

(30) Foreign Application Priority Data
Jun. 27, 2013 (CN) .......................... 2013 1 0261322

(51) Int. Cl.
*G06F 21/56* (2013.01)
*H04L 29/08* (2006.01)
(Continued)

(52) U.S. Cl.
CPC .............. *G06F 21/563* (2013.01); *G06F 8/71* (2013.01); *G06F 21/552* (2013.01); *G06F 21/57* (2013.01);
(Continued)

(58) Field of Classification Search
CPC ...... G06F 21/563; G06F 21/552; G06F 21/57; G06F 21/645; G06F 8/71;
(Continued)

(56) References Cited

U.S. PATENT DOCUMENTS

| | | | |
|---|---|---|---|
| 6,711,578 B1 * | 3/2004 | McCaw | ............ G06F 17/30286 |
| 7,996,736 B2 * | 8/2011 | Bottelli | ................ G11C 29/802 |
| | | | 711/156 |

(Continued)

FOREIGN PATENT DOCUMENTS

| | | |
|---|---|---|
| CN | 101193099 A | 6/2008 |
| CN | 101783801 A | 7/2010 |

(Continued)

OTHER PUBLICATIONS

Foreign Communication From a Counterpart Application, Chinese Application No. 201310261322.7, Chinese Search Report dated Dec. 16, 2016, 2 pages.

(Continued)

*Primary Examiner* — Catherine Thiaw
(74) *Attorney, Agent, or Firm* — Conley Rose, P.C.

(57) ABSTRACT

A web application security access method, including periodically detecting, by an application store server, if the locally stored source code is inconsistent with the source code that is corresponding to the web application and that is in the web server, adding an exception identifier to a version parameter stored on the application store server; receiving, by the application store server, an access request that is for accessing the web application and that is sent by a user by using a client, where the access request includes a user version parameter of source code corresponding to the web application installed on the client; and if detecting that the exception identifier exists in the version parameter, returning, by the application store server to the client, prompt (Continued)

information used to indicate to the user that there is a security risk in accessing the web application.

12 Claims, 7 Drawing Sheets

(51) Int. Cl.
    *H04L 29/06*     (2006.01)
    *G06F 21/55*     (2013.01)
    *G06F 21/57*     (2013.01)
    *G06F 21/64*     (2013.01)
    *G06F 9/44*     (2006.01)
    *H04W 4/00*     (2009.01)

(52) U.S. Cl.
    CPC .......... *G06F 21/645* (2013.01); *H04L 63/145* (2013.01); *H04L 63/1433* (2013.01); *H04L 67/02* (2013.01); *G06F 2221/033* (2013.01); *H04W 4/003* (2013.01)

(58) Field of Classification Search
    CPC .......... G06F 2221/033; H04L 63/1433; H04L 63/145; H04L 67/02; H04W 4/003
    See application file for complete search history.

(56) References Cited

U.S. PATENT DOCUMENTS

| | | | |
|---|---|---|---|
| 9,652,617 B1* | 5/2017 | Evans | G06F 21/57 |
| 2004/0098715 A1* | 5/2004 | Aghera | G06F 8/65 |
| | | | 717/173 |
| 2004/0216031 A1* | 10/2004 | Taylor | G06F 21/64 |
| | | | 715/263 |
| 2008/0208921 A1 | 8/2008 | Bumiller et al. | |
| 2009/0138868 A1* | 5/2009 | Vanover | G06F 8/65 |
| | | | 717/171 |
| 2011/0047620 A1 | 2/2011 | Mahaffey et al. | |
| 2012/0017275 A1 | 1/2012 | Harmonen | |
| 2012/0144248 A1* | 6/2012 | Bull | G06F 11/3664 |
| | | | 714/48 |
| 2012/0203880 A1 | 8/2012 | Kluyt et al. | |
| 2013/0263104 A1* | 10/2013 | Baset | G06F 8/68 |
| | | | 717/168 |
| 2013/0347094 A1* | 12/2013 | Bettini | H04L 63/0245 |
| | | | 726/11 |
| 2014/0032875 A1* | 1/2014 | Butler | G06F 21/554 |
| | | | 711/208 |
| 2014/0250360 A1* | 9/2014 | Jiang | G06F 17/2288 |
| | | | 715/229 |
| 2014/0310480 A1* | 10/2014 | Piry | G06F 12/0815 |
| | | | 711/146 |
| 2015/0205979 A1 | 7/2015 | Dong et al. | |

FOREIGN PATENT DOCUMENTS

| | | |
|---|---|---|
| CN | 102176722 A | 9/2011 |
| CN | 102546253 A | 7/2012 |
| CN | 102810138 A | 12/2012 |
| CN | 102945241 A | 2/2013 |
| CN | 102982258 A | 3/2013 |
| CN | 103023862 A | 4/2013 |
| CN | 103761489 A | 4/2014 |
| WO | 2013062223 A1 | 5/2013 |

OTHER PUBLICATIONS

Foreign Communication From a Counterpart Application, Chinese Application No. 201310261322.7, Chinese Office Action dated Dec. 27, 2016, 8 pages.
Partial English Translation and Abstract of Chinese Patent Application No. CN101783801, dated Dec. 17, 2015, 6 pages.
Partial English Translation and Abstract of Chinese Patent Application No. CN102176722, dated Dec. 17, 2015, 3 pages.
Partial English Translation and Abstract of Chinese Patent Application No. CN103761489, Dec. 17, 2015, 4 pages.
Foreign Communication From a Counterpart Application, PCT Application No. PCT/CN2014/080094, English Translation of International Search Report dated Sep. 29, 2014, 3 pages.
Foreign Communication From a Counterpart Application, PCT Application No. PCT/CN2014/080094, English Translation of Written Opinion dated Sep. 29, 2014, 12 pages.
Foreign Communication From a Counterpart Application, European Application No. 14817646.4, Extended European Search Report dated May 4, 2016, 8 pages.

* cited by examiner

WEB APPLICATION SECURITY ACCESS METHOD, SERVER, AND CLIENT

CROSS-REFERENCE TO RELATED APPLICATIONS

This application is a National Stage of International Application No. PCT/CN2014/080094, filed on Jun. 17, 2014, which claims priority to Chinese Patent Application No. 201310261322.7, filed on Jun. 27, 2013, both of which are hereby incorporated by reference in their entireties.

TECHNICAL FIELD

The present disclosure relates to the Internet field, and in particular, to a web application security access method, a server, and a client.

BACKGROUND

A web application is an application that is compiled by using a web language and that is constructed based on a standard web technology. Different from a traditional website, a web application emphasizes that a user is allowed to perform various operations rather than simply browse web content, for example, operations of sending an electronic mail (e-mail), hunting for a house, paying a bill, balance transferring, shopping, and sending an invitation. A traditional web, however, is content-oriented and provides convenient browsing and consumption by using static information.

A web application may be classified into the following two representation forms: a packaged web application and a hosted web application. Both source code and data of the hosted web application are stored on a server of a developer, and when releasing a web application by using an application store, the developer submits only a manifest file. When installing a web application from the application store, a client of a user obtains only an icon and a Uniform Resource Locator (URL) web address, and the user directly accesses the server of the developer by using this network address. If a malicious program is introduced when the source code of the web application is changed on the server of the developer, because the network address of the web application remains unchanged, when the user accesses the Web App, the server of the developer is directly linked to. In this way, the malicious program is downloaded to the client of the user, and there is a security risk for the user to access the web application.

SUMMARY

Technical problems to be solved by embodiments of the present disclosure are to provide a web application security access method, a server, and a client, which can solve a problem that security of accessing a web application is poor in the prior art.

To solve the foregoing technical problem, a first aspect of the present disclosure provides a web application security access method, including periodically detecting, by an application store server, whether locally stored backup source code is consistent with source code that is corresponding to a web application and that is in a web server, and if the locally stored backup source code is inconsistent with the source code that is corresponding to the web application and that is in the web server, adding an exception identifier to a version parameter stored on the application store server; receiving, by the application store server, an access request that is for accessing the web application and that is sent by a user by using a client, where the access request includes a user version parameter of source code corresponding to the web application installed on the client; and if detecting that the exception identifier exists in the version parameter that is stored on the application store server and associated with the user version parameter, returning, by the application store server to the client, prompt information used to indicate to the user that there is a security risk in the access request.

In a first possible implementation manner, in the step of returning, to the client, prompt information used to indicate to the user that there is a security risk in the access request, the prompt information includes information that indicates to the user whether to continue to access the web application and/or includes changed content of the web application.

With reference to the first aspect or the first possible implementation manner, before the step of periodically detecting, by an application store server, whether locally stored backup source code is consistent with source code that is corresponding to a web application and that is in a web server, and if the locally stored backup source code is inconsistent with the source code that is corresponding to the web application and that is in the web server, adding an exception identifier to a version parameter stored on the application store server, the method further includes saving, by the application store server, the backup source code that is corresponding to the web application that is approved, and initializing the version parameter stored on the application store server.

With reference to the second possible implementation manner of the first aspect, in a third possible implementation manner, the step of periodically detecting, by an application store server, whether locally stored backup source code is consistent with source code that is corresponding to a web application and that is in a web server includes separately obtaining, through calculation according to a preset hash algorithm, a first hash value corresponding to the backup source code and a second hash value corresponding to the source code that is corresponding to the web application and that is in the web server; and determining, by means of comparison, whether the first hash value is equal to the second hash value, and if the first hash value is equal to the second hash value, determining that the backup source code is consistent with the source code that is corresponding to the web application and that is in the web server, or if the first hash value is not equal to the second hash value, determining that the backup source code is inconsistent with the source code that is corresponding to the web application and that is in the web server.

With reference to the second possible implementation manner or the third possible implementation manner of the first aspect, in a fourth possible implementation manner, after the step of periodically detecting, by an application store server, whether locally stored backup source code is consistent with source code that is corresponding to a web application and that is in a web server, and if the locally stored backup source code is inconsistent with the source code that is corresponding to the web application and that is in the web server, adding an exception identifier to a version parameter stored on the application store server, the method further includes pushing, by the application store server to the client on which the web application is installed, a push message used to indicate that the source code of the web application has been changed, and displaying, on the client, an operation instruction to be confirmed by the user; and executing, by the application store server, a corresponding operation on the web application according to an operation instruction that is sent by the user by using the client.

With reference to the fourth possible implementation manner of the first aspect, in a fifth possible implementation manner, the step of executing, by the application store server, a corresponding operation on the web application according to an operation instruction that is sent by the user by using the client includes modifying, by the application store server according to an operation instruction, used to switch to a secure version, sent by the user by using the client, a network address of the source code that is corresponding to the web application and that is in the web server to a network address of the backup source code stored on the application store server.

With reference to the fifth possible implementation manner of the first aspect, in a sixth possible implementation manner, after the step of if detecting that the exception identifier exists in the version parameter that is stored on the application store server and associated with the user version parameter, returning, by the application store server to the client, prompt information used to indicate to the user that there is a security risk in the access request, the method further includes, when receiving an operation instruction, sent by the user by using the client, that subsequent access to the target application is allowed, forwarding, by the application store server, the access request to the web server, so that the web server responds to the access request.

With reference to the fifth possible implementation manner of the first aspect, in a seventh possible implementation manner, after the step of if detecting that the version parameter of the source code corresponding to the web application installed on the client is inconsistent with the version parameter stored on the application store server, returning, by the application store server to the client, the prompt information used to indicate to the user that there is a security risk in the access request, the method further includes, when receiving an operation instruction, sent by the user by using the client, that subsequent access to the web application is prohibited, responding, by the application store server, to the access request by using the backup source code that is corresponding to the web application and stored at a local end.

With reference to any one of the first aspect to the seventh possible implementation manner, in an eighth possible implementation manner, the method further includes periodically performing, by the web application server, virus detection on the source code that is corresponding to the web application and that is in the web server, and if a virus is detected, prohibiting the user from accessing the web application in the web server.

A second aspect of the present disclosure provides a web application security access method, including storing, by a client, backup source code that is corresponding to a web application that is approved; and when receiving an access request for accessing the web application in a web server from a user, detecting, by the client, whether the backup source code is consistent with source code that is corresponding to the web application and that is in the web server, and if the backup source code is inconsistent with the source code that is corresponding to the web application and that is in the web server, displaying prompt information used to indicate to the user that there is a security risk in the access request.

In a first possible implementation manner, in the step of displaying prompt information used to indicate to the user that there is a security risk in the access request, the prompt information includes information that indicates to the user whether to continue to access the web application and/or includes changed content of the web application.

With reference to the second aspect or the first possible implementation manner, in a second possible implementation manner, after the step of when receiving an access request for accessing the web application in a web server from a user, detecting, by the client, whether the backup source code is consistent with source code that is corresponding to the web application and that is in the web server, and if the backup source code is inconsistent with the source code that is corresponding to the web application and that is in the web server, displaying prompt information used to indicate to the user whether to continue to access the target application, the method further includes, when receiving an operation instruction, sent by the user, that subsequent access to the application is allowed, sending, by the client to the web server, the access request for accessing the web application, so that the web server responds to the access request.

With reference to the second aspect or the first possible implementation manner, in a third possible implementation manner, after the step of when receiving an access request for accessing the web application in a web server from a user, detecting, by the client, whether the backup source code is consistent with source code that is corresponding to the web application and that is in the web server, and if the backup source code is inconsistent with the source code that is corresponding to the web application and that is in the web server, displaying prompt information used to indicate to the user whether to continue to access the target application, the method further includes, when receiving an operation instruction, sent by the user, that subsequent access to the target application is prohibited, responding, by the client, to the access request by using the backup source code that is corresponding to the web application and stored at a local end.

A third aspect of the present disclosure provides an application store server, including a version parameter update module configured to periodically detect whether locally stored backup source code is consistent with source code that is corresponding to a web application and that is in a web server, and if the locally stored backup source code is inconsistent with the source code that is corresponding to the web application and that is in the web server, add an exception identifier to a version parameter stored on the application store server; a receiving module configured to receive an access request that is for accessing the web application and that is sent by a user by using a client, where the access request includes a user version parameter of source code corresponding to the web application installed on the client; and a detection module configured to, if detecting that the exception identifier exists in the version parameter that is stored on the application store server and associated with the user version parameter, return, to the client, prompt information used to indicate to the user that there is a security risk in the access request.

In a first possible implementation manner, the application store server further includes a source code saving module configured to save the backup source code that is corresponding to the web application that is approved, and initialize the version parameter stored on the application store server.

With reference to the first possible implementation manner of the third aspect, in a second possible implementation manner, the version parameter update module includes a calculation unit configured to separately obtain, through calculation according to a preset hash algorithm, a first hash value corresponding to the backup source code and a second hash value corresponding to the source code that is corresponding to the web application and that is in the web server; and a comparison unit configured to determine, by means of comparison, whether the first hash value is equal to the second hash value, and if the first hash value is equal to the second hash value, determine that the backup source code is consistent with the source code that is corresponding to the web application and that is in the web server, or if the first hash value is not equal to the second hash value, determine that the backup source code is inconsistent with the source code that is corresponding to the web application and that is in the web server.

With reference to the second possible implementation manner of the third aspect, in a third possible implementation manner, the application store server further includes a message pushing module configured to push, to the client on which the web application is installed, a push message used to indicate that the source code of the web application has been changed, and display, on the client, an operation instruction to be confirmed by the user; and an instruction executing module configured to execute a corresponding operation on the web application according to an operation instruction that is sent by the user by using the client.

With reference to the third possible implementation manner of the third aspect, in a fourth possible implementation manner, the application store server further includes a forwarding module configured to, when receiving an operation instruction, sent by the user by using the client, that subsequent access to the target application is allowed, forward the access request to the web server, so that the web server responds to the access request.

With reference to the third possible implementation manner of the third aspect, in a fifth possible implementation manner, the application store server further includes a response module configured to, when receiving an operation instruction, sent by the user by using the client, that subsequent access to the web application is prohibited, respond, by the web application server, to the access request by using the source code that is corresponding to the web application and stored at a local end.

With reference to the third aspect to the fifth possible implementation manner, in a sixth possible implementation manner, the application store server further includes a virus scanning module configured to periodically perform virus detection on the source code that is corresponding to the web application and that is in the web server, and if a virus is detected, prohibit the user from accessing the web application in the web server.

A fourth aspect of the present disclosure provides a client, including a code buffering module configured to store backup source code that is corresponding to a web application that is approved; and a change detection module configured to, when receiving an access request for accessing the web application in a web server from a user, detect whether the backup source code is consistent with source code that is corresponding to the web application and that is in the web server, and if the backup source code is inconsistent with the source code that is corresponding to the web application and that is in the web server, display prompt information used to indicate to the user that there is a security risk in the access request.

In a first possible implementation manner, the client further includes a request sending module configured to, when receiving an operation instruction, sent by the user by using the client, that subsequent access to the application is allowed, send the web server the access request for accessing the web application, so that the web server responds to the access request.

With reference to the fourth aspect, in a second possible implementation manner, the client further includes a local response module configured to, when receiving an operation instruction, sent by the user by using the client, that subsequent access to the target application is prohibited, respond, by the client, to the access request by using the backup source code that is corresponding to the web application and stored at a local end.

By implementing the present disclosure, the following beneficial effects are achieved.

An application store server locally backs up secure source code that is approved and that is in a web application server, determines, by comparing the source code in the web server with the locally stored source code, whether the source code in the web server is changed, and if the source code in the web server is changed, displays, on a client, prompt information that indicates to a user that access is risky. In this way, a situation in which source code that is of a web application and that is in the web server is tampered by a developer can be effectively detected, and the user is notified of an existing access security risk, thereby improving access security.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
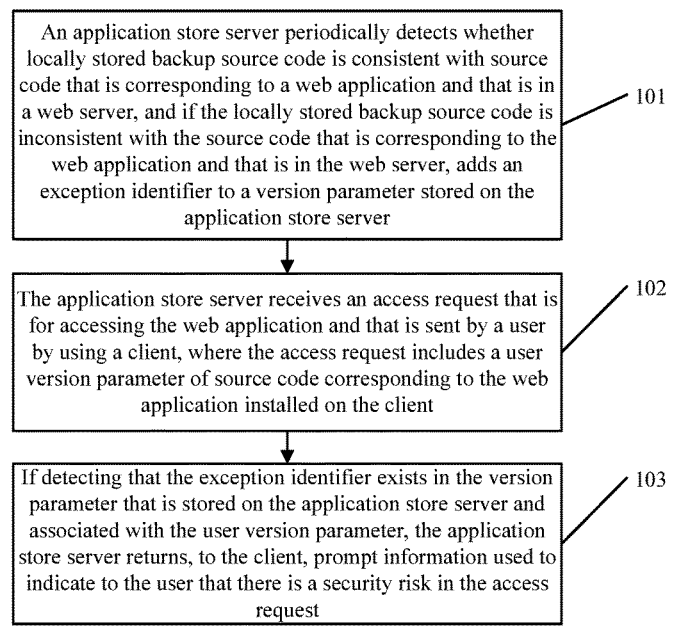
FIG. 1 shows a web application security access method according to a first embodiment of the present disclosure.

Referring to FIG. 1, FIG. 1 shows a web application security access method according to a first embodiment of the present disclosure. The method includes the following steps.

Step 101: An application store server periodically detects whether locally stored backup source code is consistent with source code that is corresponding to a web application and that is in a web server, and if the locally stored backup source code is inconsistent with the source code that is corresponding to the web application and that is in the web server, adds an exception identifier to a version parameter stored on the application store server.

An application store server end stores the approved backup source code of the web application, where the backup source code is used for backup and is submitted by a developer, and the backup source code is a latest version of the source code that is submitted to the application store server by the developer through a normal approach and that is approved. The application store server initializes a version parameter, and a representation form of the version parameter is not limited, which, for example, may be a combination of an alphabet and/or a number. When a client installs the web application by using the application store server, a version parameter of the source code corresponding to the web application on the client keeps consistent with that on the application store server, where the version parameter may be implemented by adding a new field to a manifest file corresponding to the web application. The application store server downloads, at regular intervals, the source code that is corresponding to the web application and that is in the web server; compares the backup source code with the downloaded source code to determine whether an update occurred; and if there is an update, adds the exception identifier to the version parameter stored on the application store server. For example, if a version parameter is v1.0_1.0, the part before the underline is a latest version number of the source code that is corresponding to the web application and that is in the web server, and the part after the underline is an added exception identifier, where a representation form of the exception identifier is not limited, which, for example, may be a combination of an alphabet and/or a number.

Step 102: The application store server receives an access request that is for accessing the web application and that is sent by a user by using a client, where the access request includes a user version parameter of source code corresponding to the web application installed on the client.

A scenario of the present disclosure is for a hosted web application, source code of this type of web application is stored on a server of a developer, and when a web application is released by using an application store server, only a manifest file is provided to the application store server. When installing the web application from the application store server, the client of the user obtains only an icon and a URL.

When the user clicks on the URL of the web application by using the client, the URL directs to the web server at which the source code of the web application is placed. The client acquires, from a configuration file (for example, the manifest file) of the locally installed web application, the user version parameter of the source code corresponding to the web application. The client adds the user version parameter to the access request when initiating the access request for accessing the web application to the application store server; the application store server obtains, by means of parsing according to the received access request, the user version parameter that is in the access request and of the source code corresponding to the web application installed on the client. For example, the user version parameter is v1.0.

Step 103: If detecting that the exception identifier exists in the version parameter that is stored on the application store server and associated with the user version parameter, the application store server returns, to the client, prompt information used to indicate to the user that there is a security risk in the access request.

According to step 101, the application store server detects that the user version parameter that is of the source code and reported by the client is inconsistent with the locally stored version parameter, for example, the user version parameter reported by the client is v1.0 and the version parameter that is stored on the application store server and associated with the user version parameter is v1.0_1.0, which indicates that an update occurred on the source code that is of the web application and that is in the web server, updated content is not notified to the application store server, and security of the updated part is not approved by the application store server; therefore, there is a security risk for the user. In this case, the application store server returns, to the client, the prompt information used to indicate to the user that there is a security risk in the current access request. For example, the application store server displays, on the client, a prompt message that there is a security risk and displays a dialog box with an access allowed option and an access prohibited option for the user to select.

It can be understood that, when the application store server detects that the version parameter that is of the source code and reported by the client is consistent with the locally stored version parameter, it indicates that the source code that is corresponding to the web application and on the web server is not updated and is consistent with the backup source code on the application store server; the application store server forwards the access request to the web server, and the web server responds to the access request.

Figure 2:
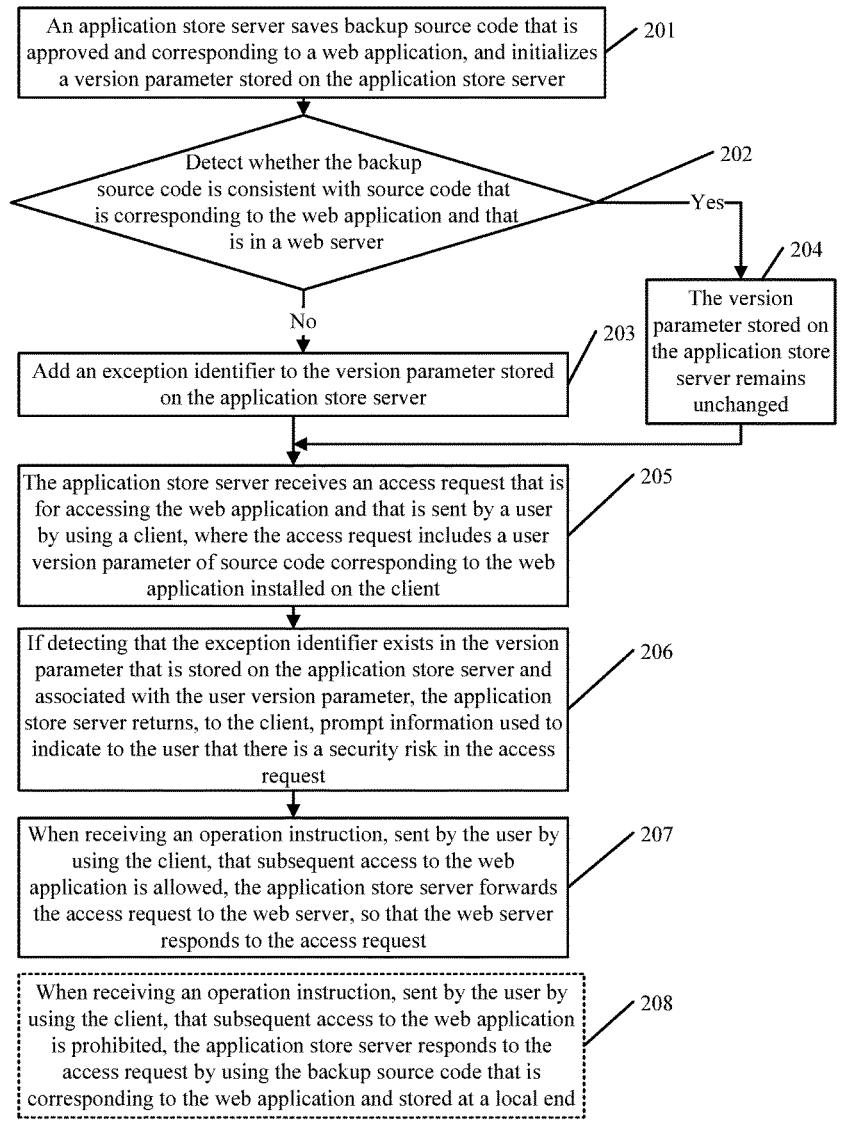
FIG. 2 shows a web application security access method according to a second embodiment of the present disclosure.

Referring to FIG. 2, FIG. 2 is a schematic flowchart of a web application security access method according to a second embodiment of the present disclosure. The method includes the following steps.

Step 201: An application store server saves backup source code that is corresponding to a web application that is approved, and initializes a version parameter stored on the application store server.

The application store server saves the backup source code of the web application, where the backup source code is used for backup and is submitted by a developer through a normal process, and the backup source code is a latest version of secure source code. The application store server initializes a version parameter according to a specific rule, and a representation form of the version parameter may be a combination of a number and/or an alphabet, for example, the application store server initializes a version parameter to v1.0.

Step 202: Detect whether the backup source code is consistent with source code that is corresponding to the web application and that is in a web server.

The application store server periodically downloads the source code of the web application from the web server and detects whether the locally stored backup source code is consistent with the downloaded source code. A detection method may be that, the application store server separately calculates a first hash value of the backup source code and a second hash value of the downloaded source code by using a preset hash algorithm (for example, Secure Hash Algorithm (SHA)-256) and determines, by means of comparison, whether the first hash value is equal to the second hash value. According to a feature of the hash algorithm, if input data is different, hash values obtained through calculation are different. If the first hash value is equal to the second hash value, it indicates that the source code in the web server is unchanged and is the same as the backup source code, or if the first hash value is not equal to the second hash value, it indicates that the source code in the web server is different from the backup source code. In this case, it can be effectively detected that a developer privately changes the source code that is of the web application and that is in the web server, thereby improving access security. If the backup source code is consistent with the source code that is corresponding to the web application and that is in the web server, step 203 is executed; and if the backup source code is inconsistent with the source code, step 204 is executed.

Further, preferably, the web application server periodically performs virus detection on the source code that is corresponding to the web application and that is in the web server. If a virus is detected, the application store server stops and disables the web application, so that a user cannot access the web application and is indicated that the web application is discontinued due to a security threat.

Step 203: Add an exception identifier to the version parameter stored on the application store server.

According to a predetermined policy, the exception identifier is added to the version parameter stored on the application store server. According to the version parameter v1.0 obtained through initialization by the application store server in step 201, the exception identifier indicates that the source code of this version of web application has unapproved updated content on the web server side, where a representation form of the exception identifier is not limited and may be a combination of a number and/or an alphabet provided that the version parameter stored on the application store server is different from a changed version parameter.

Step 204: The version parameter stored on the application store server remains unchanged.

Step 205: The application store server receives an access request that is for accessing the web application and that is sent by a user by using a client, where the access request includes a user version parameter of source code corresponding to the web application installed on the client.

A scenario of the present disclosure is for a hosted web application, source code of this type of web application is stored on a server of a developer, and when a web application is released by using an application store server, only a manifest file is provided to the application store server. When installing the web application from the application store server, the client of the user obtains only an icon and a URL.

When the user clicks on the URL of the web application by using the client, the URL directs to the web server at which the source code of the web application is placed. The client acquires, from a configuration file (for example, the manifest file) of the locally installed web application, the user version parameter of the source code corresponding to the web application. The client adds the user version parameter to the access request when initiating the access request for accessing the web application to the application store server; the application store server obtains, by means of parsing according to the received access request, the user version parameter that is in the access request and of the source code corresponding to the web application installed on the client. For example, the user version parameter is v1.0.

Step 206: If detecting that the exception identifier exists in the version parameter that is stored on the application store server and associated with the user version parameter, the application store server returns, to the client, prompt information used to indicate to the user that there is a security risk in the access request.

According to step 201, the application store server detects that the user version parameter that is of the source code and reported by the client is inconsistent with the locally stored version parameter, for example, the user version parameter reported by the client is v1.0 and the version parameter that is stored on the application store server and associated with the user version parameter is v1.0_1.0, which indicates that an update occurred on the source code that is of the web application and that is in the web server, updated content is not notified to the application store server, and security of the updated part is not approved by the application store server; therefore, there is a security risk for the user. In this case, the application store server returns, to the client, the prompt information used to indicate to the user that there is a security risk in the current access request. For example, the application store server displays, on the client, a prompt message that there is a security risk, and displays a dialog box with an access allowed option and an access prohibited option for the user to select, for example, permission to acquire a current location of the client is newly added.

It can be understood that, when the application store server detects that the user version parameter that is of the source code and reported by the client is consistent with the locally stored associated version parameter, it indicates that the source code that is corresponding to the web application and on the web server is not updated and is consistent with the backup source code on the application store server; the application store server forwards the access request to the web server, and the web server responds to the access request.

Step 207: When receiving an operation instruction, sent by the user by using the client, that subsequent access to the web application is allowed, the application store server forwards the access request to the web server, so that the web server responds to the access request.

When the user clicks on an access allowed button displayed in the dialog box on the client to send the application store server the operation instruction that subsequent access is allowed, the application store server forwards the access request to the web server and the web server responds to the access request.

In some embodiments of the present disclosure, in step 206, the user may select an operation instruction that access is prohibited, and in this case, a procedure is shown in step 208.

Step 208: When receiving an operation instruction, sent by the user by using the client, that subsequent access to the web application is prohibited, the application store server responds to the access request by using the source code that is corresponding to the web application and stored at a local end.

When the user clicks on an access prohibited button displayed in the dialog box on the client to send the application store server the operation instruction that subsequent access is prohibited, the application store server directly responds to the access request by using the locally stored backup source code. The application store server provides the user with a function of rolling back to a buffered secure version, so that access security for a user is improved.

Figure 3:
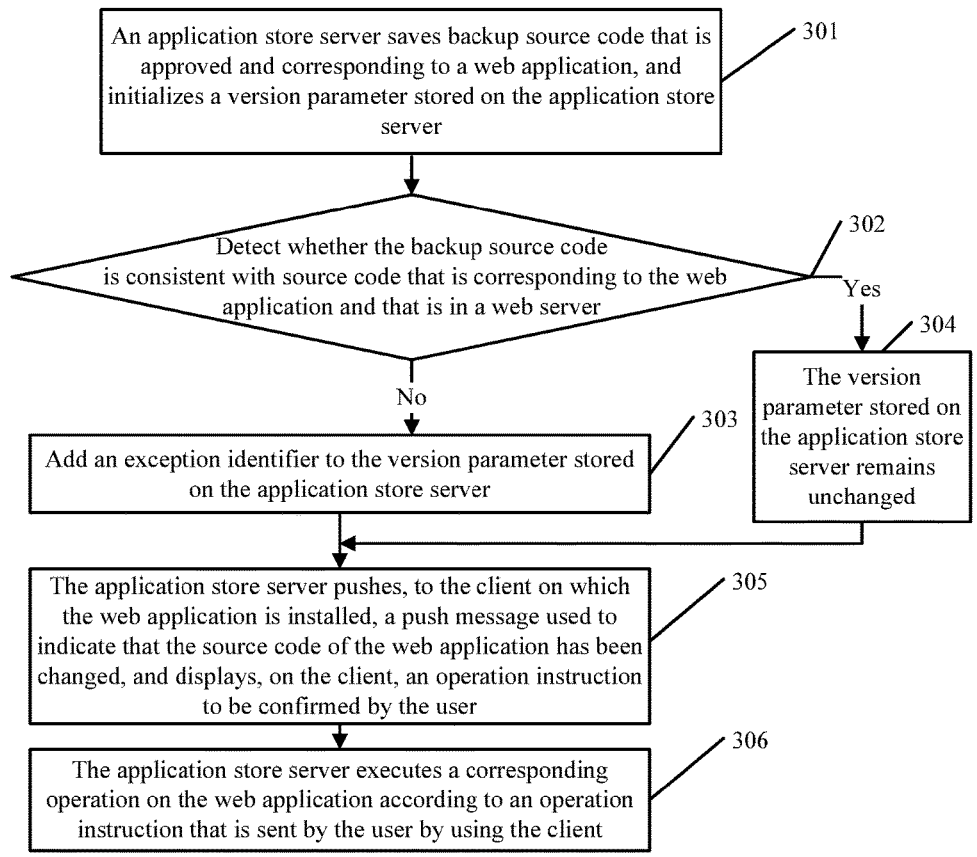
FIG. 3 shows a web application security access method according to a third embodiment of the present disclosure.

Referring to FIG. 3, FIG. 3 is a schematic flowchart of a web application security access method according to a third embodiment of the present disclosure. The method includes the following steps.

Step 301: An application store server saves backup source code that is corresponding to a web application that is approved, and initializes a version parameter stored on the application store server.

Step 302: Detect whether the backup source code is consistent with source code that is corresponding to the web application and that is in a web server.

Step 303: Change, according to a predetermined policy, the version parameter stored on the application store server.

Step 304: The version parameter stored on the application store server remains unchanged.

Step 305: The application store server pushes, to the client on which the web application is installed, a push message used to indicate that the source code of the web application has been changed, and displays, on the client, an operation instruction to be confirmed by the user.

When the backup source code is inconsistent with the source code that is corresponding to the web application and that is in the web server, the application store server actively pushes, to the client on which the web application is installed, the push message used to indicate that the source code of the web application has been changed, to indicate to the user that there may possibly be a threat; and displays a dialog box with operation instructions for the user to select, for example, displaying three options such as "Ignore", "Delete", and "Switch to a secure version", where "Ignore" indicates that the web application normally runs when the user opens and accesses the web application again, "Delete" indicates to delete the web application from the client of the user, and "Switch to a secure version" indicates to switch a network address of the web application installed on the client to a network address (that is, the backup source code) of a secure version buffered by the application store server. Certainly, another option and a corresponding operation instruction may be set, and the present disclosure sets no limit thereto.

Step 306: The application store server executes a corresponding operation on the web application according to an operation instruction that is sent by the user by using the client.

According to this embodiment of the present disclosure, an application store server locally backs up secure source code that is approved and that is in a web application server, determines, by comparing the source code in the web server with the locally stored source code, whether the source code in the web server is changed, and if the source code in the web server is changed, displays, on a client, prompt information that indicates to a user that access is risky. In this way, a situation in which source code that is of a web application and that is in the web server is tampered by a developer can be effectively detected, and the user is notified of an existing access security risk, thereby improving access security.

Figure 4:
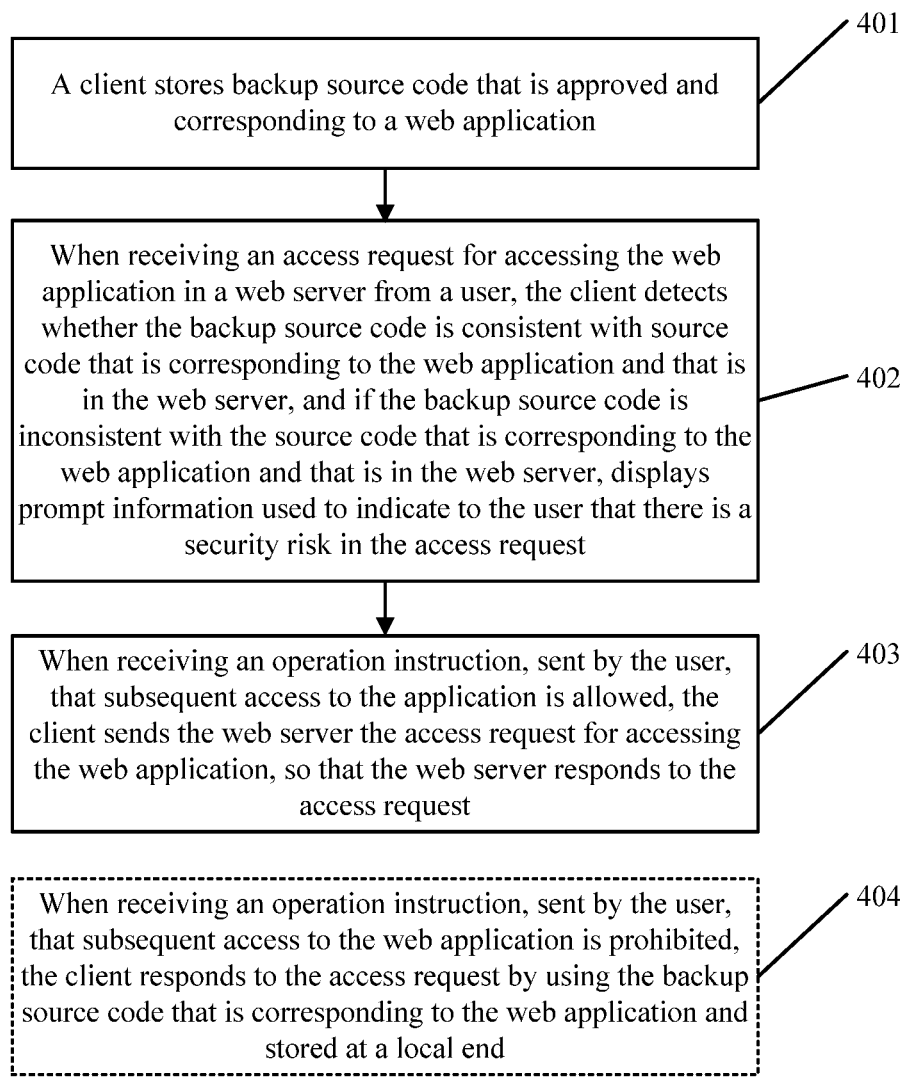
FIG. 4 shows a web application security access method according to a fourth embodiment of the present disclosure.

Referring to FIG. 4, FIG. 4 shows a web application security access method according to a fourth embodiment of the present disclosure. The method includes the following steps.

Step 401: A client stores backup source code that is approved and corresponding to a web application.

A scenario of the present disclosure is for a hosted web application, source code of this type of web application is stored on a server of a developer, and when a web application is released by using an application store server, only a manifest file is provided to the application store server. When installing the web application from the application store server, the client of the user obtains only an icon and a URL.

The client saves the backup source code of the web application, where the backup source code is used for backup and is submitted by a developer through a normal process, and the backup source code is a latest version of secure source code.

Step 402: When receiving an access request for accessing the web application in a web server from a user, the client detects whether the backup source code is consistent with source code that is corresponding to the web application and that is in the web server, and if the backup source code is inconsistent with the source code that is corresponding to the web application and that is in the web server, the client displays prompt information used to indicate to the user that there is a security risk in the access request.

When receiving the access request for accessing the web application in the web server from the user, the client periodically downloads the source code of the web application from the web server and detects whether the locally stored backup source code is consistent with the downloaded source code. A detection method may be that, the client separately calculates a first hash value of the backup source code and a second hash value of the downloaded source code by using a preset hash algorithm (for example, SHA-256) and determines, by means of comparison, whether the first hash value is equal to the second hash value. According to a feature of the hash algorithm, if input data is different, hash values obtained through calculation are different. If the first hash value is equal to the second hash value, it indicates that the source code in the web server is unchanged and is the same as the backup source code, or if the first hash value is not equal to the second hash value, it indicates that the source code in the web server is different from the backup source code. In this case, it can be effectively detected that a developer privately changes the source code that is of the web application and that is in the web server, thereby improving access security. If a detection result is that the source code is different from the backup source code, it indicates that the source code on the web server is changed, and there may possibly be a security threat; and the client displays prompt information used to indicate to the user that there is a security risk in the current access request, where the prompt information includes information that indicates to the user whether to continue to access the web application and includes changed content of the web application. For example, the client displays a dialog box with an access allowed option and an access prohibited option for the user to select, and also displays the changed content of the web application, for example, permission to acquire a current location of the client is added.

Step 403: When receiving an operation instruction, sent by the user, that subsequent access to the application is allowed, the client sends the web server the access request for accessing the web application, so that the web server responds to the access request.

The user clicks on an access allowed button displayed in the dialog box on the client to send the client the operation instruction that subsequent access is allowed, and the client sends the access request to the web server and the web server responds to the access request.

In some embodiments of the present disclosure, in step 402, the user may select an operation instruction that access is prohibited, and in this case, a procedure is shown in step 404.

Step 404: When receiving an operation instruction, sent by the user, that subsequent access to the web application is prohibited, the client responds to the access request by using the backup source code that is corresponding to the web application and stored at a local end.

The user clicks on an access prohibited button displayed in the dialog box on the client to send the client the operation instruction that access is prohibited, and the client directly responds to the access request by using the locally stored backup source code. The client provides, for the user, a function of rolling back to a buffered secure version, so that access security for a user is improved.

According to this embodiment of the present disclosure, a client locally backs up secure source code that is approved and that is in a web application server, determines, by comparing the source code in the web server with the locally stored source code, whether the source code in the web server is changed, and if the source code in the web server is changed, displays prompt information that indicates to a user that access is risky. In this way, a situation in which source code that is of a web application and that is in the web server is tampered by a developer can be effectively detected, and the user is notified of an existing access security risk, thereby improving access security.

Figure 5:
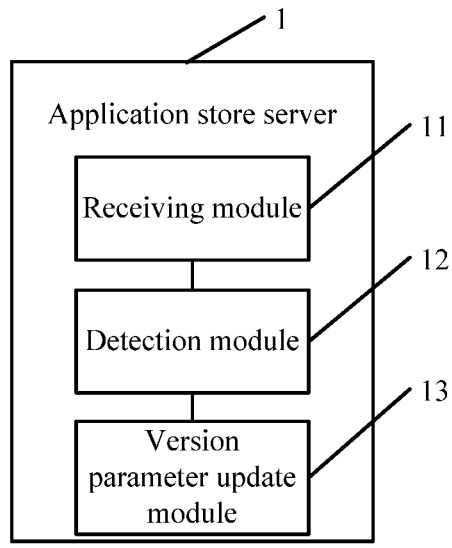
FIG. 5 is a schematic structural diagram of an application store server according to a first embodiment of the present disclosure.

Referring to FIG. 5, FIG. 5 is a schematic structural diagram of an application store server according to a first embodiment of the present disclosure. The application store server 1 includes a receiving module 11, a detection module 12, and a version parameter update module 13.

The version parameter update module 13 is configured to periodically detect whether locally stored backup source code is consistent with source code that is corresponding to a web application and that is in a web server, and if the locally stored backup source code is inconsistent with the source code that is corresponding to the web application and that is in the web server, add an exception identifier to a version parameter stored on the application store server.

An application store server end stores the approved backup source code of the web application, where the backup source code is used for backup and is submitted by a developer, and the backup source code is a latest version of the source code that is submitted to the application store server by the developer through a normal approach and that is approved. The application store server initializes a version parameter, and a representation form of the version parameter is not limited, which, for example, may be a combination of an alphabet and/or a number. When a client installs the web application by using the application store server, a version parameter of the source code corresponding to the web application on the client keeps consistent with that on the application store server, where the version parameter may be implemented by adding a new field to a manifest file corresponding to the web application. The version parameter update module 13 of the application store server downloads, at regular intervals, the source code that is corresponding to the web application and that is in the web server; and compares the backup source code with the downloaded source code to determine whether an update occurred, and if there is an update, adds the exception identifier to the version parameter stored on the application store server. For example, if a version parameter is v1.0_1.0, the part before the underline is a latest version number of the source code that is corresponding to the web application and that is in the web server, and the part after the underline is an added exception identifier, where a representation form of the exception identifier is not limited, which, for example, may be a combination of an alphabet and/or a number.

The receiving module 11 is configured to receive an access request that is for accessing the web application and that is sent by a user by using a client, where the access request includes a user version parameter of source code corresponding to the web application installed on the client.

When the user clicks on a URL of the web application by using the client, the URL directs to the web server at which the source code of the web application is placed. The client acquires, from a configuration file (for example, the manifest file) of the locally installed web application, the version parameter of the source code corresponding to the web application. The client adds the version parameter to the access request when initiating the access request for accessing the web application to the application store server. The receiving module 11 of the application store server obtains, by means of parsing according to the received access request, the version parameter that is in the access request and of the source code corresponding to the web application installed on the client. For example, the user version parameter is v1.0.

The detection module 12 is configured to, if detecting that the exception identifier exists in the version parameter that is stored on the application store server and associated with the user version parameter, return, to the client, prompt information used to indicate to the user that there is a security risk in the access request.

The detection module 12 of the application store server detects that the version parameter that is of the source code and reported by the client is inconsistent with the locally stored version parameter, for example, the user version parameter reported by the client is v1.0 and the version parameter that is stored on the application store server and associated with the user version parameter is v1.0_1.0, which indicates that an update occurred on the source code that is of the web application and that is in the web server, updated content is not notified to the application store server, and security of the updated part is not approved by the application store server; therefore, there is a security risk for the user. In this case, the application store server returns, to the client, the prompt information used to indicate to the user that there is a security risk in the current access request. For example, the application store server displays, on the client, a prompt message that there is a security risk and displays a dialog box with an access allowed option and an access prohibited option for the user to select.

It can be understood that, when the detection module 12 of the application store server detects that the version parameter that is of the user source code and reported by the client is consistent with the locally stored version parameter, it indicates that the source code that is corresponding to the web application and on the web server is not updated and is consistent with the backup source code on the application store server; the application store server forwards the access request to the web server, and the web server responds to the access request.

Figure 6:
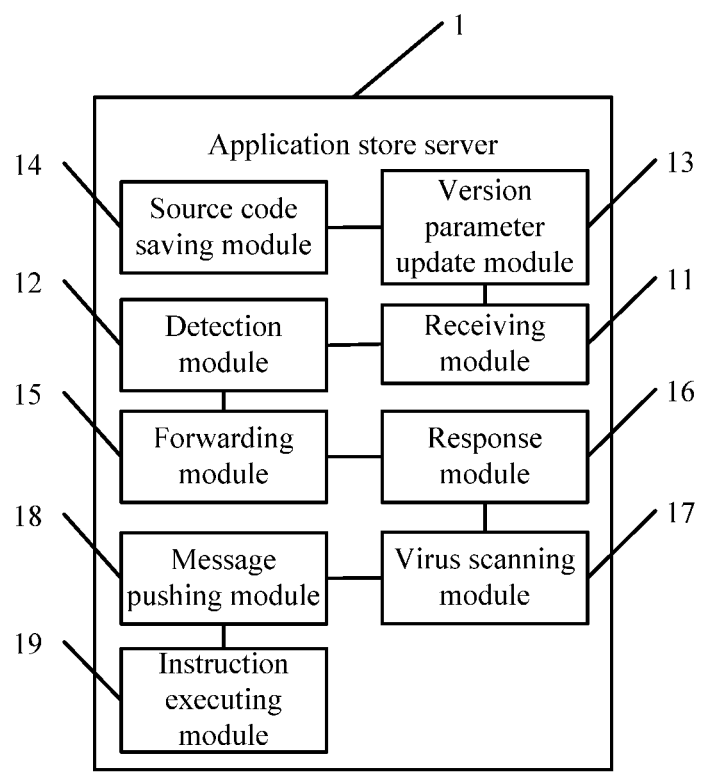
FIG. 6 is a schematic structural diagram of an application store server according to a second embodiment of the present disclosure.
Figure 7:
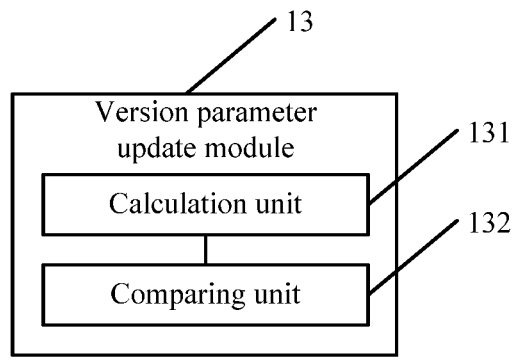
FIG. 7 is a schematic structural diagram of a version parameter update module shown in FIG. 6.

Further, preferably, referring to FIG. 6 and FIG. 7, FIG. 6 and FIG. 7 are schematic structural diagrams of a web application server according to a second embodiment of the present disclosure. In addition to the receiving module 11, the detection module 12, and the version parameter update module 13, the web application server further includes a source code saving module 14, a forwarding module 15, a response module 16, a virus scanning module 17, a message pushing module 18, and an instruction executing module 19.

The source code saving module 14 is configured to save the backup source code that is approved and corresponding to the web application, and initialize the version parameter stored on the application store server.

The forwarding module 15 is configured to, when receiving an operation instruction, sent by the user by using the client, that subsequent access to the target application is allowed, forward the access request to the web server, so that the web server responds to the access request.

The response module 16 is configured to, when receiving an operation instruction, sent by the user by using the client, that subsequent access to the web application is prohibited, respond, by the web application server, to the access request by using the source code that is corresponding to the web application and stored at a local end.

The virus scanning module 17 is configured to periodically perform virus detection on the source code that is corresponding to the web application and that is in the web server, and if a virus is detected, prohibit the user from accessing the web application in the web server.

The message pushing module 18 is configured to push, to the client on which the web application is installed, a push message used to indicate that the source code of the web application has been changed, and display, on the client, an operation instruction to be confirmed by the user.

The instruction executing module 19 is configured to execute a corresponding operation on the web application according to an operation instruction that is sent by the user by using the client.

Further, preferably, the version parameter update module 13 includes a calculation unit 131 configured to separately obtain, through calculation according to a preset hash algorithm, a first hash value corresponding to the backup source code and a second hash value corresponding to the source code that is corresponding to the web application and that is in the web server; and a comparison unit 132 configured to determine, by means of comparison, whether the first hash value is equal to the second hash value, and if the first hash value is equal to the second hash value, determine that the backup source code is consistent with the source code that is corresponding to the web application and that is in the web server, or if the first hash value is not equal to the second hash value, determine that the backup source code is inconsistent with the source code that is corresponding to the web application and that is in the web server.

Figure 8:
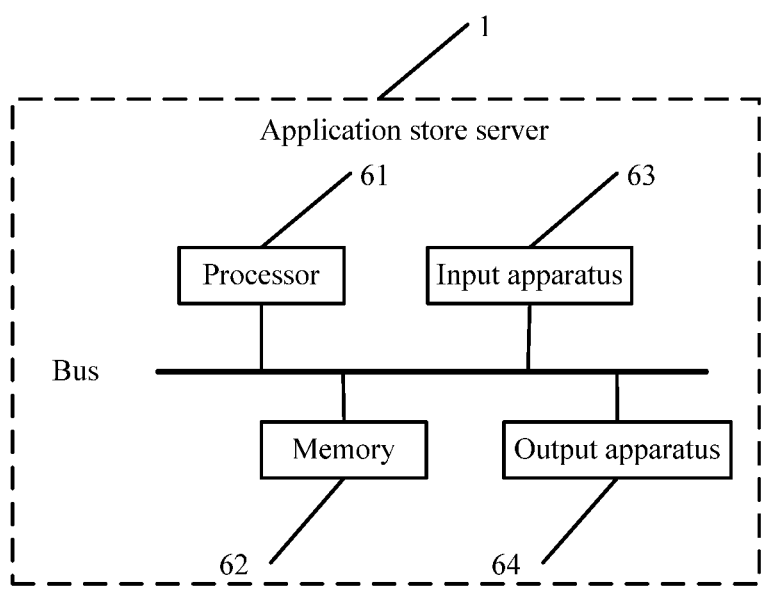
FIG. 8 is a schematic structural diagram of an application store server according to a third embodiment of the present disclosure.

Referring to FIG. 8, FIG. 8 is a schematic structural diagram of an application store server according to a third embodiment of the present disclosure. The application store server 1 includes a processor 61, a memory 62, an input apparatus 63, and an output apparatus 64. The application store server 1 may include one or more processors 61. In FIG. 8, one processor is used as an example. In some embodiments of the present disclosure, the processor 61, the memory 62, the input apparatus 63, and the output apparatus 64 may be connected by using a bus or in another manner. In FIG. 8, bus connection is used as an example.

The memory 62 stores a set of program code, and the processor 61 is configured to invoke the program code stored in the memory 62 to execute the following operations: periodically detecting whether locally stored backup source code is consistent with source code that is corresponding to a web application and that is in a web server, and if the locally stored backup source code is inconsistent with the source code that is corresponding to the web application and that is in the web server, adding an exception identifier to a version parameter stored on the application store server; receiving an access request that is for accessing the web application and that is sent by a user by using a client, where the access request includes a user version parameter of source code corresponding to the web application installed on the client; and if detecting that the exception identifier exists in the version parameter that is stored on the application store server and associated with the user version parameter, returning, to the client, prompt information used to indicate to the user that there is a security risk in the access request.

In some embodiments of the present disclosure, the processor 61 is further configured to execute, before the step of periodically detecting, by the application store server, whether locally stored backup source code is consistent with source code that is corresponding to a web application and that is in a web server, and if the locally stored backup source code is inconsistent with the source code that is corresponding to the web application and that is in the web server, adding an exception identifier to a version parameter stored on the application store server, further including saving, by the application store server, the backup source code that is approved and corresponding to the web application, and initializing the version parameter stored on the application store server.

In some embodiments of the present disclosure, that the processor 61 executes the step of periodically detecting, by an application store server, whether locally stored backup source code is consistent with source code that is corresponding to a web application and that is in a web server includes separately obtaining, through calculation according to a preset hash algorithm, a first hash value corresponding to the backup source code and a second hash value corresponding to the source code that is corresponding to the web application and that is in the web server; and determining, by means of comparison, whether the first hash value is equal to the second hash value, and if the first hash value is equal to the second hash value, determining that the backup source code is consistent with the source code that is corresponding to the web application and that is in the web server, or if the first hash value is not equal to the second hash value, determining that the backup source code is inconsistent with the source code that is corresponding to the web application and that is in the web server.

In some embodiments of the present disclosure, the processor 61 is further configured to execute: pushing, to the client on which the web application is installed, a push message used to indicate that the source code of the web application has been changed, and displaying, on the client, an operation instruction to be confirmed by the user; and executing a corresponding operation on the web application according to an operation instruction that is sent by the user by using the client.

In some embodiments of the present disclosure, that the processor 61 executes the step of executing, by the application store server, a corresponding operation on the web application according to an operation instruction that is sent by the user by using the client includes modifying, by the application store server according to an operation instruction, used to switch to a secure version, sent by the user by using the client, a network address of the source code that is corresponding to the web application and that is in the web server to a network address of the backup source code stored on the application store server.

In some embodiments of the present disclosure, the processor 61 is further configured to execute: when receiving an operation instruction, sent by the user by using the client, that subsequent access to the target application is allowed, forwarding the access request to the web server, so that the web server responds to the access request.

In some embodiments of the present disclosure, the processor 61 is further configured to execute: when receiving an operation instruction, sent by the user by using the client, that subsequent access to the web application is prohibited, responding, by the application store server, to the access request by using the backup source code that is corresponding to the web application and stored at a local end.

In some embodiments of the present disclosure, the processor 61 is further configured to execute: periodically performing virus detection on the source code that is corresponding to the web application and that is in the web server, and if a virus is detected, prohibiting the user from accessing the web application in the web server.

Figure 9:
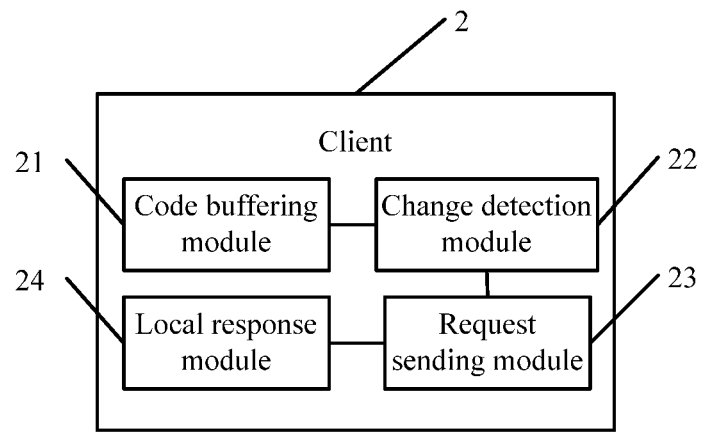
FIG. 9 is a schematic structural diagram of a client according to a first embodiment of the present disclosure.

Referring to FIG. 9, FIG. 9 is a schematic structural diagram of a client of a first embodiment of the present disclosure. The client 2 includes a code buffering module 21, a change detection module 22, a request sending module 23, and a local response module 24.

The code buffering module 21 is configured to store backup source code that is approved and corresponding to a web application.

A scenario of the present disclosure is for a hosted web application, source code of this type of web application is stored on a server of a developer, and when a web application is released by using an application store server, only a manifest file is provided to the application store server. When installing the web application from the application store server, the client of the user obtains only an icon and a URL.

The code buffering module 21 of the client saves the backup source code of the web application, where the backup source code is used for backup and is submitted by the developer through a normal process, and the backup source code is a latest version of secure source code.

The change detection module 22 is configured to, when receiving an access request for accessing the web application in a web server from a user, detect whether the backup source code is consistent with source code that is corresponding to the web application and that is in the web server, and if the backup source code is inconsistent with the source code that is corresponding to the web application and that is in the web server, display prompt information used to indicate to the user that there is a security risk in the access request.

When receiving the access request for accessing the web application in the web server from the user, the change detection module 22 of the client periodically downloads the source code of the web application from the web server and detects whether the locally stored backup source code is consistent with the downloaded source code. A detection method may be that, the change detection module 22 separately calculates a first hash value of the backup source code and a second hash value of the downloaded source code by using a preset hash algorithm (for example, SHA-256) and determines, by means of comparison, whether the first hash value is equal to the second hash value. According to a feature of the hash algorithm, if input data is different, hash values obtained through calculation are different. If the first hash value is equal to the second hash value, it indicates that the source code in the web server is unchanged and is the same as the backup source code, or if the first hash value is not equal to the second hash value, it indicates that the source code in the web server is different from the backup source code. In this case, it can be effectively detected that a developer privately changes the source code that is of the web application and that is in the web server, thereby improving access security. If a detection result is that the source code is different from the backup source code, it indicates that the source code on the web server is changed, there may possibly be a security threat; the client displays prompt information used to indicate to the user whether to continue to access the web application. For example, the client displays a prompt message that there is a security risk and displays a dialog box with an access allowed option and an access prohibited option for the user to select.

The request sending module 23 is configured to, when receiving an operation instruction, sent by the user by using the client, that subsequent access to the application is allowed, send the web server the access request for accessing the web application, so that the web server responds to the access request.

The local response module 24 is configured to, when receiving an operation instruction, sent by the user by using the client, that subsequent access to the target application is prohibited, respond, by the client, to the access request by using the backup source code that is corresponding to the web application and stored at a local end.

Figure 10:
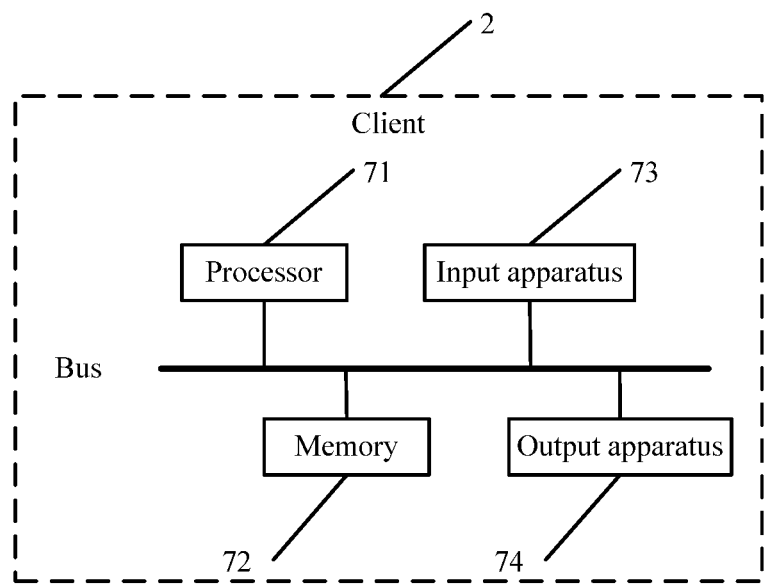
FIG. 10 is a schematic structural diagram of a client according to a second embodiment of the present disclosure.

Referring to FIG. 10, FIG. 10 is a schematic structural diagram of a client according to a second embodiment of the present disclosure. An application client 2 includes a processor 71, a memory 72, an input apparatus 73, and an output apparatus 74. The client 2 may include one or more processors 71. In FIG. 10, one processor is used as an example. In some embodiments of the present disclosure, the processor 71, the memory 72, the input apparatus 73, and the output apparatus 74 may be connected by using a bus or in another manner. In FIG. 10, bus connection is used as an example.

The memory 72 stores a set of program code, and the processor 71 is configured to invoke the program code stored in the memory 72 to execute the following operations: storing backup source code that is approved and corresponding to a web application; and when receiving an access request for accessing the web application in a web server from a user, detecting whether the backup source code is consistent with source code that is corresponding to the web application and that is in the web server, and if the backup source code is inconsistent with the source code that is corresponding to the web application and that is in the web server, displaying prompt information used to indicate to the user that there is a security risk in the access request.

In some embodiments of the present disclosure, the processor 71 is further configured to execute: when receiving an operation instruction, sent by the user, that subsequent access to the application is allowed, sending the web server the access request for accessing the web application, so that the web server responds to the access request.

In some embodiments of the present disclosure, the processor 71 is further configured to execute: when receiving an operation instruction, sent by the user, that subsequent access to the target application is prohibited, responding, by the client, to the access request by using the backup source code that is corresponding to the web application and stored at a local end.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may include a magnetic disk, an optical disc, a read-only memory (ROM), or a random access memory (RAM).

What is disclosed above is merely exemplary embodiments of the present disclosure, and certainly is not intended to limit the protection scope of the present disclosure. A person of ordinary skill in the art may understand that all or some of processes that implement the foregoing embodiments and equivalent modifications made in accordance with the claims of the present disclosure shall fall within the scope of the present disclosure.

What is claimed is:

1. An application store server for web application security access, comprising:
    a memory comprising instructions; and
    a processor coupled to the memory, wherein the instructions cause the processor to be configured to:
        periodically detect whether a first source code of a web application in the application store server is consistent with a second source code of the web application in a web server;
        add an exception identifier to a version parameter of the first source code stored-on the application store server when the first source code is inconsistent with the second source code;
        receive an access request for accessing the web application from a client, wherein the access request comprises a user version parameter for third source code for the web application installed on the client;
        transmit prompt information to the client indicating a security risk in accessing the web application when detecting the exception identifier in the version parameter of the first source code and associated with the user version parameter;
        send, to the client, a push message indicating that the second source code has changed, and in response, receiving from the client an operation instruction; and
        execute the operation instruction on the web application, wherein the operation instruction causing to modify a second network address of the second source code to a first network address of the first source code stored on the application store server, thereby switching a network address of the web application to a secure version of the web application in the application store server.

2. The application store server according to claim 1, wherein the instructions further cause the processor to be configured to:
    store approved source code of the web application that is approved as the first source code; and
    initialize the version parameter of the first source code on the application store server.

3. The application store server according to claim 1, wherein the instructions further cause the processor to be configured to:
    separately obtain, through calculation according to a preset hash algorithm, a first hash value corresponding to the first source code and a second hash value corresponding to the second source; and
    determine, by means of comparison, whether the first hash value is equal to the second hash value; and
    determine that the first source code is inconsistent with the second source code when the first hash value is not equal to the second hash value.

4. The application store server according to claim 1, wherein the instructions further cause the processor to be configured to push, to the client, a push message indicating that the second source code displayed on the client has changed, wherein the push message comprises the operation instruction for confirmation by the client.

5. A web application security access method, comprising:
    storing, by an application store server, approved source code of a web application as a first source code;
    periodically detecting, by the application store server, whether the first source code of the web application in the application store server is consistent with a second source code of the web application in a web server;
    adding an exception identifier to a version parameter of the first source code stored on the application store server when the first source code is inconsistent with the second source code;
    receiving, by the application store server, an access request for accessing the web application from a client, wherein the access request comprises a user version parameter for a third source code of the web application installed on the client; and
    transmitting, by the application store server, prompt information to the client indicating a security risk in accessing the web application when detecting the exception identifier in the version parameter of the first source code on the application store server and associated with the user version parameter;
    sending, by the application store server to the client, a push message indicating that the second source code has changed and, in response, receiving, by the application store server, an operation instruction from the client; and
    executing, by the application store server, the operation instruction causing to modify a second network address of the second source code to a first network address of the first source code stored on the application store server thereby switching a network address of the web application to a secure version of the web application in the application store server.

6. The web application security access method according to claim 5, wherein the prompt information comprises information that indicates whether to continue to access the web application.

7. The web application security access method according to claim 5, wherein the prompt information comprises changed content of the web application.

8. The web application security access method according to claim 5, further comprising:
    initializing, on the application store server, the version parameter of the stored first source code.

9. The web application security access method according to claim 5, wherein periodically detecting, by the application store server, whether the first source code is consistent with the second source code comprises:
    separately obtaining, through calculation according to a preset hash algorithm, a first hash value corresponding to the first source code and a second hash value corresponding to the second source code; and
    determining, by means of comparison, whether the first hash value is equal to the second hash value; and
    determining that the first source code is inconsistent with the second source code when the first hash value is not equal to the second hash value.

10. The web application security access method according to claim 5, comprising, forwarding, by the application store server, the access request to the web server and receiving a response from the web server that subsequent access to the web application is allowed.

11. The web application security access method according to claim 5, comprising, responding, by the application store server, to the access request using the first source code corresponding to the web application on the application store server.

12. The web application security access method according to claim 5, further comprising:
   periodically performing, by the application store server, virus detection on the second source code of the web application; and
   prohibiting the client from accessing the web application in the web server when a virus is detected.

* * * * *